Sept. 19, 1961 S. L. BROADHEAD, JR., ET AL 3,001,161

VARIABLE INDUCTOR HAVING A VARIABLE TAP

Original Filed Nov. 19, 1956

INVENTORS.
SAMUEL L. BROADHEAD, JR.
MERRILL T. LUDVIGSON
BY Marvin Moody
ATTORNEY United States Patent Office 3,001,161

Patented Sept. 19, 1961

3,001,161

VARIABLE INDUCTOR HAVING A VARIABLE TAP

Samuel L. Broadhead, Jr., and Merrill T. Ludvigson, Cedar Rapids, Iowa, assignors to Collins Radio Company, Cedar Rapids, Iowa, a corporation of Iowa Original application Nov. 19, 1956, Ser. No. 623,088, now Patent No. 2,921,273, dated Jan. 12, 1960. Divided and this application Feb. 3, 1958, Ser. No. 712,997

1 Claim. (Cl. 336—15)

Figures 1, 2:
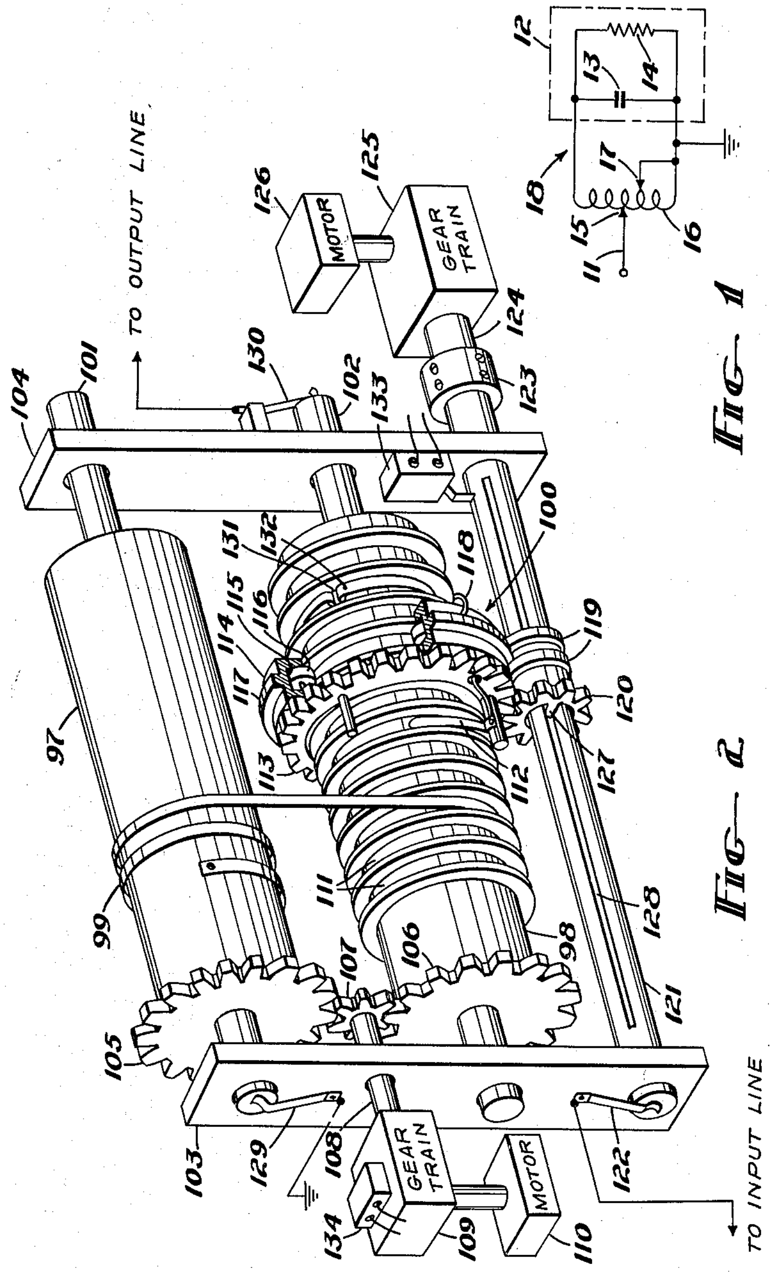

This invention pertains to variable inductors and particularly to variable inductors having a variable tap. Inductors of this type are useful in impedance matching networks and are particularly useful in radio antenna couplers. The inductor described herein was originally described in the parent application entitled "Automatic Antenna Coupler," Serial No. 623,088, filed November 19, 1956, now Patent No. 2,921,273 issued January 12, 1960.

An object of the present invention is to provide a variable inductor having a variable tap that will provide reliable operation in an impedance matching system. The description of the variable inductor of this invention and the appended claims may be more readily understood with reference to the accompanying drawings, in which:

FIGURE 1 is a simplified schematic diagram of a usual impedance matching network, and FIGURE 2 is an oblique view of the solenoid inductor of this invention.

The usual impedance matching network shown in FIGURE 1 is connected between an input line 11 and an output line or load circuit 12. The load circuit is represented by an equivalent capacitor 13 and load resistor 14 that are connected in parallel. The input line is connected to variable tap 15 of variable inductor 16 so that the input line 11 is connected between ground and that point of inductor 16 which is determined by the position of the variable tap 15. The variable inductor and the output load circuit 12 are connected in parallel. In this example, the total inductance of inductor 16 is changed by moving tap 17 for short-circuiting a different number of turns between the tap and the grounded end of the inductor.

It is well known in the art that impedance of the output line 12 may be matched to the impedance of input line 11 providing the capacitive reactance of equivalent capacitor 13 is equal to the selected value of inductive reactance of inductor 16 and the equivalent resistor 14 has a resistance greater than the resistance required by the input line 11 for proper loading. When these conditions are fulfilled, impedance of output line 12 can be matched to the impedance of input line 11 for various values of equivalent resistor 14 by properly positioning tap 15 on inductor 16. When the capacitive reactance of the load is greater than the maximum inductive reactance of variable inductor 16, a capacitor may be connected in parallel with inductor 16 and load 12. When the resistance of the load is low, a capacitor may be connected in series with inductor 16 and load 12 to provide desired loading on input line 11. The variable inductor of this invention provides a wide range of inductance and provides a variable tap for connecting to this inductor at any point so that desired impedance matching may be obtained over a wide range of frequencies.

The inductor of FIGURE 2 includes conducting cylindrical coil form 97 and a non-conducting cylindrical coil form 98. These forms are mounted with their axes parallel and have means for rotating them in the same direction. Conducting ribbon 99, which comprises the winding of the inductor, is wound around the two forms so that when the forms are rotated, the conductor is unwound off one form and wound onto the other. The portion of the conductor that is wound on conducting form 97 is short-circuited and becomes ineffective in providing inductance. Inductance of the inductor is, therefore, dependent upon that portion of conducting ribbon 99 that is wound on non-conducting form 98. To this inductor has been added a new tap assembly 100 for providing a continuously variable tap on a variable inductor that is suitable for application to an impedance matching circuit which may be similar to that shown in FIGURE 1.

The forms 97 and 98 are mounted on parallel shafts 101 and 102. These shafts are rotatably mounted between parallel end supports 103 and 104 which are fabricated from electrical insulating material. Spur gears 105 and 106 are rigidly fastened to shafts 101 and 102, respectively, for rotating respective coil forms 97 and 98. Both of these gears engage gear 107 that is affixed to drive shaft 108. Drive shaft 108 is rotatably mounted between shafts 101 and 102 on end support 103, and is driven through gear train 109 by motor 110. Although drive shaft 108 is shown operated by motor 110, of course, it is to be understood that the drive shaft could be operated manually. In an automatic impedance matching system, motor 110 may be a servo motor that is controlled by a phase sensing system that is connected to an input line corresponding to line 11 of FIGURE 1.

On the outer surface of non-conducting form 98 is a helical groove 111 for receiving conducting ribbon 99. A variable tap for the inductor is provided by wiper 112 which is attached to tap assembly 100. The tap assembly is arranged for moving wipe 112 along groove 111 for contacting the bare outer surface of conducting ribbon 99. Tap assembly includes ring gear 113 of non-conducting material attached to insulating collar 114. The inside diameters of gear 113 and collar 114 are slightly larger than the outside diameter of coil form 98. The inside surface of collar 114 has a groove 115 in which are mounted a plurality of spaced rollers 116. These rollers are placed in groove 111 for threading tap assembly 100 onto coil form 98. Conducting ring 117 is mounted on the periphery of insulating collar 114 and is connected to contact 112 through conductor 118 which extends through holes provided in collar 114 and gear 113. A pair of conducting rings 119 are coaxially attached to gear 120 to form an assembly that is mounted on shaft 121. Shaft 121 is rotatably mounted parallel to the coil forms between end supports 103 and 104 and spaced relative to tap assembly 100 for engaging ring gear 113 with gear 120 and contact ring 117 between the pair of conducting rings 119. Shaft 121 has a longitudinal groove 128 for receiving an internal tooth 127 that projects inwardly from gear 120. Gear 120 is, therefore, free to move longitudinally on shaft 121 but is not free to rotate thereon. Electrical connection from wiper 112 is completed through shaft 121 to spring contact 122 which is urged against the end of the shaft. Shaft 121 is connected through insulating coupling 123 to drive shaft 124 which is connected to the output of gear train 125. Although the input of gear train 125 may be operated manually for rotating tap assembly 100, it will usually be operated by a servo motor shown as motor 126. The servo motor may be controlled by a sensing circuit that is connected to the input line so that it will sense the loading on the line.

Electrical connection across the variable inductor is made through contact 129 that bears against shaft 101 and contact 130 which bears against shaft 102. As previously described, one end of inductor 99 is connected through conducting coil form 97 to shaft 101. The other end of inductor 99 is threaded inwardly through hole 131 and connected to shaft 102. In order that the diameter of groove 111 may have uniform diameter for retaining tap assembly 100, a plastic ribbon 132 may be placed in the groove near the end of the form beyond that point where conducting ribbon 99 enters hole 131. Limit switches 133 and 134 may be used in connection with servo control systems for determining the limits of operation of the variable tap and the variable inductor respectively. Limit switch 133 is mounted on end support 104 so that it is operated by mechanical contact with tap assembly 100 when it is rotated until the tap is positioned at the end of conductor 99. Limit switch 134 is mechanically connected to gear train 109 so that it is operated when coil forms 97 and 98 have been rotated until most of conducting ribbon 99 is wound on the non-conducting coil form 98.

The inductor of FIGURE 2 may be used readily in the simplified circuit shown in FIGURE 1. The input line 11 of FIGURE 1 is then connected to the variable tap of FIGURE 2 through contact 122. Conductor 18 of FIGURE 1 that is connected to a tuning capacitor and a load is connected to contact 130 which completes a connection to one end of the variable solenoid winding. The ground connection of FIGURE 1 is connected through contact 129 of FIGURE 2 and through conducting form 97 to the other end of the solenoid winding.

This variable solenoid is particularly useful in high power systems because undesirable sparking is reduced to a minimum in a relatively compact inductor assembly. Although the inductor of this invention has been shown in one embodiment, details of mechanical construction may be varied and still be within the spirit and scope of the following claim.

What is claimed is:

A variable inductor of the type having a conducting cylinder, a non-conducting cylinder, a conducting ribbon in a continuous helical winding on the circumference of both of said cylinders, and first means for rotating said cylinders to vary inversely the number of turns of ribbon thereon; a tap assembly operable for providing a continuously variable electrical contact to that portion of the ribbon which is wound on said non-conducting cylinder, said tap assembly having a ring gear and an attached insulating collar coaxially encircling on said non-conducting cylinder, a plurality of rollers mounted on the inner surface of said collar, said non-conducting cylinder having a helical groove on the outer surface thereof for receiving said ribbon, said tap assembly being threaded to said non-conducting form by having said rollers in said groove so that when said assembly is rotated the rollers travel over said ribbon and follow said groove, an electrical contact fixed to said tap assembly and extending inward to contact said ribbon within the groove, a conducting ring mounted on the circumference of said insulating collar, said contact being electrically connected to said conducting ring, terminal means for connecting said conducting ring, a driving gear engaging said ring gear, and second means operating through said driving gear for rotating said tap assembly.

References Cited in the file of this patent

UNITED STATES PATENTS

| | | |
|---|---|---|
| 1,158,123 | Fessenden | Oct. 26, 1915 |
| 1,624,364 | Richard | Apr. 12, 1927 |
| 1,845,406 | Gebhard | Feb. 16, 1932 |
| 2,223,080 | Swarbrick | Nov. 26, 1940 |
| 2,666,905 | Gerlach | Jan. 19, 1954 |
| 2,691,096 | Starner | Oct. 5, 1954 |
| 2,785,261 | Roberts | Mar. 12, 1957 |

FOREIGN PATENTS

| | | |
|---|---|---|
| 827,878 | France | Feb. 2, 1938 |